US008583323B2

(12) United States Patent
Katou et al.

(10) Patent No.: US 8,583,323 B2
(45) Date of Patent: Nov. 12, 2013

(54) VEHICLE-USE ELECTRONIC CONTROL DEVICE

(75) Inventors: Hirotsugu Katou, Hekinan (JP); Naoto Sakai, Kariya (JP)

(73) Assignee: Denso Corporation, Kariya (JP)

( * ) Notice: Subject to any disclaimer, the term of this patent is extended or adjusted under 35 U.S.C. 154(b) by 140 days.

(21) Appl. No.: 13/096,293

(22) Filed: Apr. 28, 2011

(65) Prior Publication Data

US 2011/0270490 A1    Nov. 3, 2011

(30) Foreign Application Priority Data

Apr. 28, 2010    (JP) .................................. 2010-103821

(51) Int. Cl.
*G06F 7/00*    (2006.01)

(52) U.S. Cl.
USPC .......................................................... 701/36

(58) Field of Classification Search
USPC ........ 701/1, 36; 700/11, 12, 14, 16, 291, 295, 700/296, 297; 340/438
See application file for complete search history.

(56) References Cited

U.S. PATENT DOCUMENTS

| 5,542,035 | A  | * | 7/1996  | Kikinis et al. ................. 713/323 |
| 7,146,265 | B2 | * | 12/2006 | Oyama et al. .................... 701/66 |
| 8,281,167 | B2 |   | 10/2012 | Nakamura et al. |

| 2008/0201023 | A1 | * | 8/2008 | Berglund ........................... 701/1 |
| 2009/0183018 | A1 |   | 7/2009 | Nakamura et al. |
| 2010/0045231 | A1 | * | 2/2010 | He .................................. 320/108 |

FOREIGN PATENT DOCUMENTS

| JP | 7-183978       |   | 7/1995 |
| JP | 2002-081239    |   | 3/2002 |
| JP | 2002081239  A  | * | 3/2002 |
| JP | 2004-022293    |   | 1/2004 |
| JP | 2007-030593    |   | 2/2007 |
| JP | 2007030593  A  | * | 2/2007 |
| JP | 2007-246033    |   | 9/2007 |
| JP | 2009-166549    |   | 7/2009 |
| JP | 2009-202822    |   | 9/2009 |

OTHER PUBLICATIONS

Office Action (2 pages) dated Jul. 23, 2013, issued in corresponding Japanese Application No. 2010-103821 and English translation (3 pages).

* cited by examiner

*Primary Examiner* — Khoi Tran
*Assistant Examiner* — Adam Mott
(74) *Attorney, Agent, or Firm* — Nixon & Vanderhye PC

(57) ABSTRACT

The vehicle-use electronic control device includes a main microcomputer and a sub microcomputer. The sub-microcomputer is configured to be in one of a normal operation mode, a sleep mode and a stop mode, and to learn a frequent use time period in which frequency of use of the vehicle is high. The sub-microcomputer continues to be in the sleep mode if the frequent use time period prevails, and changes from the sleep mode to the stop mode if the frequent use time period does not prevail in order to further reduce the dark current.

16 Claims, 8 Drawing Sheets

FIG. 6

| | SUNDAY | MONDAY | TUESDAY | WEDNESDAY | THURSDAY | FRIDAY | SATURDAY |
|---|---|---|---|---|---|---|---|
| PREVIOUS WEEK: RECORDS OF OPERATION OF PUSH START SWITCH | — | a. 6:00<br>b. 13:00<br>c. 17:00 | a. 7:00<br>b. 19:00 | a. 7:00<br>b. 11:00<br>c. 19:00 | a. 6:00<br>b. 13:00<br>c. 18:00 | a. 7:00<br>b. 19:00 | a. 10:00<br>b. 21:00 |
| CURRENT DAY: RECORDS OF OPERATION OF PUSH START SWITCH | a. 10:00<br>b. 21:00 | a. 6:00<br>b. 19:00 | a. 7:00<br>b. 20:00 | a. 7:00<br>b. 13:00<br>c. 21:00 | a. 6:00<br>b. 20:00 | a. 9:00<br>b. 16:00<br>c. 20:00 | a. 11:00<br>b. 13:00<br>c. 14:30<br>d. 22:00 |
| NEXT WEEK: SLEEP MODE-SET TIME PERIODS | a. 9:00~11:00<br>(10:00)<br>b. 20:00~22:00<br>(21:00) | a. 5:00~7:00<br>(6:00)<br>b. 17:00~19:00<br>(18:00) | a. 6:00~8:00<br>(7:00)<br>b. 18:30~20:30<br>(19:30) | a. 6:00~8:00<br>(7:00)<br>b. 11:00~13:00<br>(12:00)<br>c. 19:00~21:00<br>(20:00) | a. 5:00~7:00<br>(6:00)<br>b. 19:00~21:00<br>(20:00) | a. 7:00~9:00<br>(8:00)<br>b. 15:00~17:00<br>(16:00)<br>c. 18:30~20:30<br>(19:30) | a. 9:30~11:30<br>(10:30)<br>b. 12:00~15:30<br>(13:00,14:30)<br>c. 20:30~22:30<br>(21:30) |

VEHICLE-USE ELECTRONIC CONTROL DEVICE

This application claims priority to Japanese Patent Application No. 2010-103821 filed on Apr. 28, 2010, the entire contents of which are hereby incorporated by reference.

BACKGROUND OF THE INVENTION

1. Field of the Invention

The present invention relates to an electronic control device for use in a vehicle.

2. Description of Related Art

The number of electronic control devices mounted on a vehicle and power consumption of the vehicle are ever increasing with increasing complexity of the functions of the vehicle. Accordingly, it is strongly required to reduce power consumption of an electronic control device mounted on a vehicle, especially to reduce power consumption (dark current) of an electronic control device supplied with power all the time from a vehicle battery while the vehicle is parked. Although the dark current occurs by various causes, it is mainly due to circuit components including a microcomputer included in the electronic control device, which require power supply to operate even while the vehicle is not used.

Many methods have been proposed to reduce power consumption of a vehicle-mounted electronic control device supplied with power from a vehicle battery all the time, including the one in which a microcomputer is set in the so-called sleep mode to minimize the functions of the microcomputer while the vehicle is not used to reduce power consumption as much as possible while the vehicle is not used. Also, it is known to configure a microcomputer of a vehicle-mounted electronic control device to execute a predetermined operation at intermittent periods while the microcomputer is in the sleep mode in order to detect wake-up factors, so that the microcomputer recovers from the sleep mode quickly as necessary.

Further, it is proposed to set the intermittent periods differently for different time periods of a day to further reduce the dark current. For example, refer to Japanese patent Application Laid-open No. 2002-81239 (patent document 1). According to this proposal, a day is divided into a commuting time, a daytime and a late-night time, and the intermittent periods are set to increase in this order.

Further, there is known an electronic control device including a plurality of microcomputers and configured to detect wake-up factors by only a power supply IC thereof, in order to collectively control power supply and reset cancel of the microcomputers. For example, refer to Japanese Patent Application Laid-open No. 2007-30593 (patent document 2).

However, the technique disclosed in patent document 1 is not different from conventional techniques in that it requires performing an intermittent operation all the time, although the intermittent periods are set differently for different time periods of a day. Hence, the effect of reduction of the dark current is not large enough.

There is a concern in the technique disclosed in patent document 2 that power is consumed more than necessary because all the CPUs are woken up when a wake-up factor is detected regardless of whether all the CPUs are required to operate.

Further, since the power supply IC is configured to perform signal exchange with all the CPUs to determine whether a sleep condition is satisfied for the respective CPUs, and perform various processes including detection of wake-up factors to start power supply to the CPUs, the structure of the power supply IC itself becomes complicated causing power consumption thereof to increase. In addition, since the CPUs are not supplied with power at all and stop operation completely while they are in the sleep mode, the technique disclosed in patent document 2 cannot address the need for at least one of the CPUs to continue to execute essential minimal processes even during the sleep mode.

SUMMARY OF THE INVENTION

An embodiment provides a vehicle-use electronic control device including at least one function circuit and a power supply means to generate an operating voltage of the function circuit from a battery voltage of a battery mounted on a vehicle, and supply the operating voltage to the function circuit, comprising:

a first microcomputer constituting a function circuit and configured to be in a normal operation mode to operate normally while a predetermined start condition is satisfied, and to be in a sleep mode where consumption current thereof is smaller than in the normal operation mode while a predetermined standby condition is satisfied;

a clock means to clock a current tune to provide current time information indicating at least a current time;

a use detection means to detect use of the vehicle in a predetermined use state;

a prediction means to acquire the current time information from the clock means when the use detection means detects use of the vehicle, and performs a predictive calculation to calculate a frequent use time period in which frequency of use of the vehicle is high based on the acquired time information; and a storage means to store the calculated frequent use time period;

wherein the first microcomputer outputs a power shut off command to the power supply means instructing to shut off supply of the operating voltage to the first microcomputer when the first microcomputer is in the sleep mode and the frequent use time period does not prevail, and informs the clock means of a start time of the next frequent use time period referring to stored contents of the storage means, the clock means outputs a start signal to the power supply means when the start time informed from the first microcomputer is reached, and the power supply means shuts off supply of the operating voltage to the first microcomputer upon reception of the power shut off command from the first microcomputer, and starts supply of the operating voltage to the first microcomputer upon reception of the start signal from the clock means.

According to the present invention, there is provided a vehicle-use electronic control device greatly reduced in its dark current, while ensuring convenience for the vehicle user.

Other advantages and features of the invention will become apparent from the following description including the drawings and claims.

BRIEF DESCRIPTION OF THE DRAWINGS

In the accompanying drawings:

FIG. 6 is a diagram for explaining a method of calculating a sleep mode-set time period;

PREFERRED EMBODIMENTS OF THE INVENTION

First Embodiment

Figure 1:
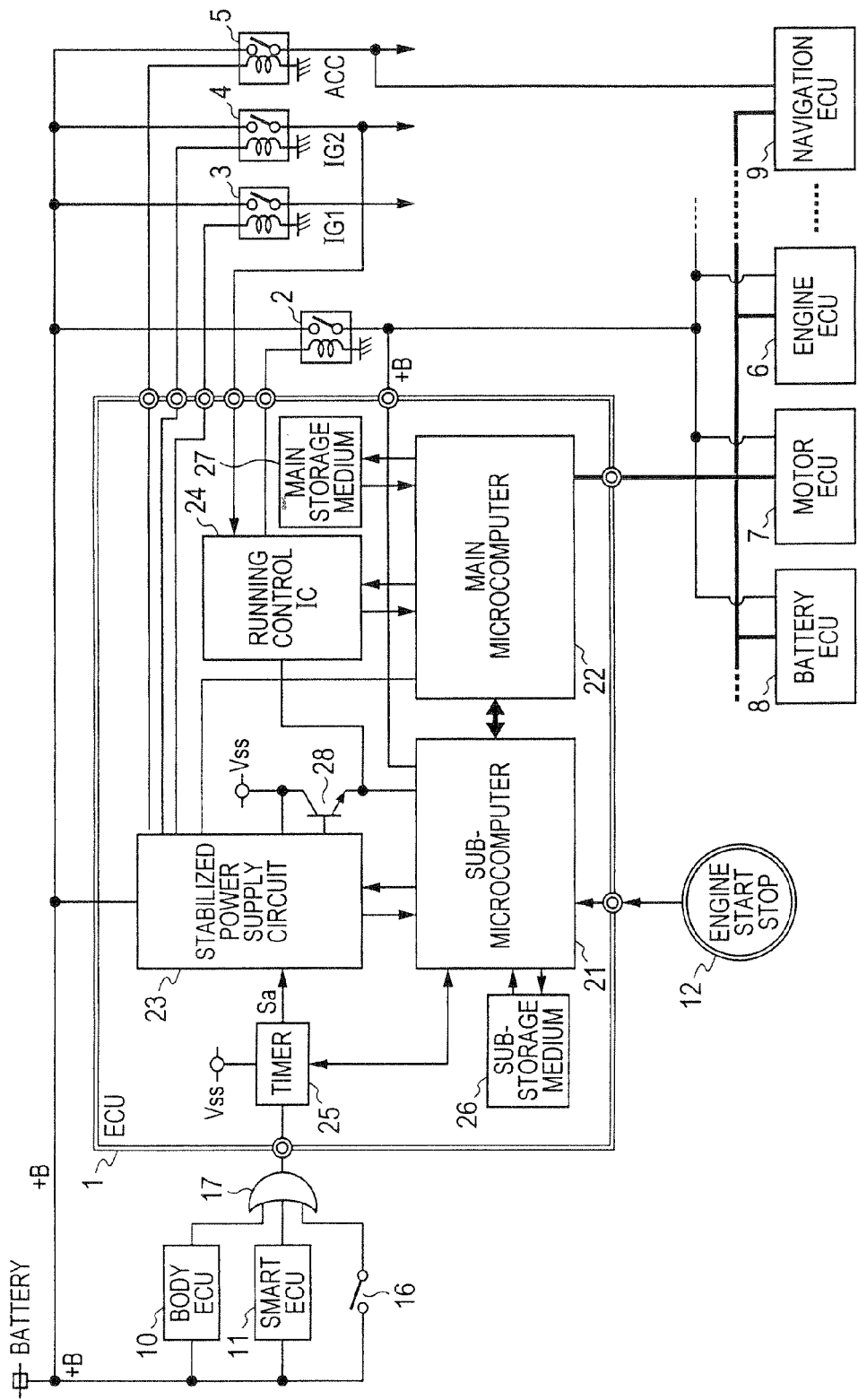
FIG. 1 is a diagram schematically showing the structure of a electronic control system including an ECU 1 as a first embodiment of the invention.

FIG. 1 is a diagram schematically showing the structure of a electronic control system including an ECU (electronic control unit) 1 as a first embodiment of the invention. The electronic control system of this embodiment is mainly constituted of an ECU 1 as an electronic control device of the invention, a main relay 2, a plurality of relays including a first IG (ignition) relay 3, a second IG relay 4, and an ACC (accessory) relay 5 driven by the ECU 1, a plurality of ECUs including an engine ECU 6, a motor ECU 7, a battery ECU 8 and a navigation ECU 9 which perform data communication with the ECU 1, and operation system ECUs including a body ECU 10 and a smart ECU 11.

This electronic control system is mounted on a hybrid vehicle equipped with, as a running power source of the vehicle, an internal combustion engine (not shown) and an electric motor (not shown) powered by a secondary battery.

The ECM, which is always supplied with a battery voltage +B to operate from a vehicle battery, includes a power source start control function, a running control function and a battery control function. The power source start control function is for driving the respective relays 2, 3, 4 and 5 in response to a vehicle start signal generated when the vehicle user operates a push start switch 12 of the vehicle, and controlling power supply within the ECU1. The running control function is for controlling the engine ECU 6 and motor ECU 7 by performing data communication with these running system ECUs 6 and 7 through an in-vehicle network such as CAN, to thereby control the running power source. The battery control function is for controlling charge and discharge of a secondary battery (not shown) mounted on the vehicle by performing data communication with the battery ECU 8 through the in-vehicle network.

When the main relay 20 is turned on by the ECU 1, the battery voltage +B is supplied as a power supply voltage to the running system ECUs including the engine ECU 6 and the motor ECU 8. When the first IG relay 3 and the second IG relay 4 are turned on by the ECU 1, the battery voltage +B is supplied as a power supply voltage to not shown ignition system ECUs including a not shown meter ECU and a not shown brake ECU. Further, when the ACC relay 5 is turned on by the ECU 1, the battery voltage +B is supplied as a power supply voltage to the navigation ECU 9 and not shown accessory devices including an audio device.

Incidentally, the reason why the supply of the battery voltage +B is implemented through two different lines, the line including the first IG relay 3 and the line including the second IG relay 4 is that the capacity of one relay is not enough to relay power required by all the IG system ECUs, and it is convenient to divide the power supply line in accordance with functions.

The engine ECU 6 is for controlling the internal combustion engine of the vehicle. The motor ECU 7 is for controlling the torque and rotational speed of a not-shown motor. The battery ECU 8 is for monitoring the charged capacity, voltage, charge/discharge current and temperature of the secondary battery, and transmitting the monitoring results to the ECU 1.

The body ECU 10 is for controlling lock/unlock of the vehicle doors, opening/closing of the power windows. The smart ECU 11 is for performing communication with a smart key carried by the vehicle user to perform various controls in accordance with the contents of the communication with the smart key.

For example, the body ECU 10 outputs a door unlock signal when the vehicle door is unlocked. Other than the door unlock signal, the body ECU 8 outputs a body system operation signal of the high level when the user performs a predetermined operation to the vehicle.

The smart ECU 11 outputs a smart system operation signal of the high level when the smart key carried by the user approaches the vehicle and predetermined communication is performed between the ECU 11 and the smart key, or when an operation switch provided in the smart key is manipulated by the user and the ECU 11 detects this operation through communication with the smart key.

The vehicle on which the electronic control system of this embodiment is mounted is equipped with a door open/close detection switch 16 for each of the vehicle doors, which is turned on upon detecting the open sate of the corresponding vehicle door. One end of the door open/close detection switch 16 is always applied with the battery voltage +B, and the other end is connected to one of the inputs of an OR circuit 17. Accordingly, when the door open/close detection switch 16 turns on, the battery voltage +B is inputted to the OR circuit 17. The battery voltage +B inputted to the OR circuit 17 through the door open/close detection switch 16 may be referred to as "door open signal" in the following.

The battery voltage +B is directly inputted to the body ECU 10 and the smart ECU 11 so that they operate all the time. When at least one of the body system operation signal from the body ECU 10, the smart system operation signal from the smart ECU 11 and the door open signal from the door open/close detection switch 16, all of which are at the high level, is inputted to the OR circuit 17, the OR circuit 17 outputs a signal of the high level (referred to as "external start signal" hereinafter) to the ECU 1.

That is, when the user performs any of the predetermined operations to the vehicle, the OR circuit 17 outputs the external start signal indicative of the user having one of the predetermined operations.

The ECU 1 is mainly constituted of a main microcomputer 22, a sub-microcomputer 21, a stabilized power supply circuit 23, a running control IC 24 and a timer 25. The ECU 1 is a function-integrated product including multiple microcomputers to perform different controls.

The sub-microcomputer 21 is connected to a nonvolatile sub-storage medium 26 such as an EEPROM. The main microcomputer 22 is connected to a nonvolatile main storage medium 27.

The stabilized power supply circuit 23 is supplied with the battery voltage +B to operate all the time in order to generate a power supply voltage necessary for the respective components of the ECU 1 to operate, and drive the IG relays 3 and 4 and the AAC relay 5 in accordance with a command received from the sub-microcomputer 21.

The stabilized power supply circuit 23 generates an internal supply voltage Vss to be always supplied to the ECU 1. The internal supply voltage Vss is directly supplied to the circuit components required to operate all the time (the timer 25, for example) in the ECU 1. The internal supply voltage Vss is also supplied to the sub-microcomputer 21 and the running control IC 24 through a power supply control transistor 28 when a predetermined condition is satisfied.

Normally, the stabilized power supply circuit 23 turns on the power supply control transistor 28 to supply the internal supply voltage Vss to the sub-microcomputer 21. However, the stabilized power supply circuit 23 turns off the power supply control transistor 28 to stop supply of the internal supply voltage Vss to the sub-microcomputer 21 upon reception of a power supply shut off request signal from the sub-microcomputer 21, as described later.

The stabilized power supply circuit 23 is configured to receive an internal power supply start signal Sa outputted from the timer 25. The stabilized power supply circuit 23 turns on the power supply control transistor 28 to cause the sub-microcomputer 21 to operate when the internal power supply start signal Sa is received from the timer 25 while the power supply control transistor 28 is off to shut off supply of the internal supply voltage Vss to the sub-microcomputer 21.

An RTC (real time clock) known as a time management device is used as the timer 25. The timer 25 operates all the time on the internal supply voltage Vss supplied from the stabilized power supply circuit 23 in order to clock the time to provide current time information including year, month, date, day, hour, minute and second.

The timer 25 outputs the internal power supply start signal Sa to the stabilized power supply circuit 23 when a start time set by the sub-microcomputer 21 is reached. The timer 25 is configured to receive the external start signal from the OR circuit 17 located outside the ECU 1. The timer 25 outputs the internal power supply start signal Sa to the stabilized power supply circuit 23 also when the external start signal is received.

The sub-microcomputer 21 is set in one of a wake-up mode where the sub-microcomputer 21 is supplied with the internal supply voltage Vss to operate normally, a sleep mode where only the essential functions such as the function of receiving a vehicle start signal from the push start switch 12 are activated, and a stop mode where supply of the internal supply voltage Vss to the sub-microcomputer 21 is shut off so that the sub-microcomputer 21 stops operation completely.

The main function of the sub-microcomputer 21 is to control power and relay drive signals outputted from the stabilized power supply circuit 23 by outputting various commands and signals to the stabilized power supply circuit 23 in response to operation of the push start switch 12. In addition, the sub-microcomputer 21 has a learning function to learn a time period during which the vehicle is used at a high frequency, and stores this learned time period as a sleep mode-set time period, a function to change itself to the stop mode by outputting a power supply shut off request signal to the stabilized power supply circuit 23 when the vehicle is not used and the sleep mode-set time period is not reached, and a function to set date and time of start of the next sleep mode in the timer 25 before changing itself to the stop mode.

Basically, the sub-microcomputer 21 is in the wake-up mode to operate normally while the push start switch 12 is on, and changes to the sleep mode when the push start switch 12 is turned off to minimize the dark current while the vehicle is not used.

However, the dark current flows to some extent even in the sleep mode, because essential functions of the sub-microcomputer 2 are still used in the sleep mode. Accordingly, in this embodiment, the learning function learns a time period of a day during which the likelihood that the push start switch 12 is turned on by the user is low, and sets this learned time period as the sleep mode-set time period. Further, if a time at which the sub-microcomputer 21 has changed to the sleep mode is not within the sleep mode set time period, it further changes to the stop mode. By this, the dark current can be reduced considerably. Incidentally, the sleep mode-set time period is set singularly or plurally differently for each day of week.

The running control IC 24 enables various functions related to the running control of the vehicle, while cooperating with the main microcomputer 22. One of the functions of the running control IC 24 is to drive the main relay 2 as explained later.

The push start switch 12 is a push button type switch operated by the vehicle driver. When the push start switch 12 is pushed, the vehicle start signal is inputted to the sub-microcomputer 21. The sub-microcomputer 21 outputs a power supply control signal in predetermined pattern to the stabilized power supply circuit 23 each time the push start switch 12 is pushed.

More specifically, each time the push start switch 12 is pushed, the sub-microcomputer 21 outputs the power supply control signal to indicate "turning off of all the relays (that is, turning off the power)", "turning on of only the ACC relay 5 (ACCON state)", "further turning on of the IG relays 3 and 4 and the main relay 2 (IGON state)", and "turning off of all the relays (that is, turning off the power)" sequentially in this order.

The stabilized power supply circuit 23 turns on only the ACC relay upon reception of the power supply control signal indicative of the push start switch having been pushed in the state of the power being off. As a result, the battery voltage +B is supplied to the respective ACC system devices.

When the push start switch 12 is pushed again in this state, the power supply control signal indicating to the effect is inputted to the stabilized power supply circuit 23 from the sub-microcomputer 2 in order to further turn on the IG relays 3 and 4. As a result, the IG system ECUs are supplied with the battery voltage B+.

The battery voltage B+ is supplied also to the running control IC 24 of the ECU 1 through the second IG relay 4. The running control IC 24 turns on the main relay 2 when supplied with the battery voltage B+ from the second IG relay 4. As a result, the battery voltage B+ is supplied to the running system ECUs 6, 7, 8, etc, and further to the sub-microcomputer 21 of the ECU 1. In consequence, the sub-microcomputer 21 outputs a main microcomputer power supply signal to the stabilized power supply circuit 23, and as a result, the main microcomputer 22 is supplied with the operating voltage from the stabilized power supply circuit 23 to start operation.

The main microcomputer 22 performs entire running control while performing communication mainly with the running system ECUs including the engine ECU 6, motor ECU 7 and battery ECU 8. The main microcomputer 22 is not supplied with power from the stabilized power supply circuit 23 to stop operation while the vehicle is in the power off state. When the push start switch 12 is pushed twice to change the vehicle from the power off state to the IGON state, the main microcomputer 22 is supplied with the operating voltage from the stabilized power supply circuit 23 to start operation.

Incidentally, the sub-microcomputer 21 and the main microcomputer 22 exchange data with each other through DMA communication. As described above, the ECU 1 of this embodiment includes a plurality of (two, in this embodiment)

microcomputers assigned with different roles. The reason for this is to reduce the dark current and improve the control reliability.

In more detail, in this embodiment, the functions to work all the time are undertaken by one microcomputer (the sub-microcomputer 21), so that the other microcomputer (the main microcomputer 22) can stop operation completely in order to reduce the power consumption of the entire system. Further, power supply to the sub-microcomputer 21 is also completely shut off under a predetermined condition in order to extensively reduce the dark current as described later. By assigning the running control which is paramount in the vehicle to one microcomputer (the main microcomputer 22) separated from the other microcomputer (the sub-microcomputer 22), the reliability of the running control can be improved. It is possible to further improve the reliability of the running control by configuring the other microcomputer to monitor the running system microcomputer (main microcomputer).

The current consumption of the ECU 1 having the above described structure changes roughly in four steps mainly in accordance with the operation modes of the sub-microcomputer 21. The current consumption of the ECU1 becomes maximum when both the main microcomputer 21 and the sub-microcomputer 22 are supplied with power to operate normally in the wake-up mode (referred to as "both microcomputers wake-up state" hereinafter). In this both microcomputers wake-up state, the current consumption is at the largest value of 320 mA in an example of the operation of the ECU 1 shown in FIG. 3.

The current consumption in the state where the sub-microcomputer 21 operates normally, that is, operates in the wake-up mode and the main microcomputer 22 is not supplied with power and stops operation (referred to as "one microcomputer wake-up state" hereinafter) is smaller by one step than that in the both microcomputers wake-up state. In the example shown in FIG. 3, the current consumption in this one microcomputer wake-up state is at the second largest value of 100 mA.

The consumption current in the state where the main microcomputer 21 stops operation and the sub-microcomputer 21 is in the sleep mode (referred to as "sub-microcomputer sleep state" hereinafter) is smaller by one step than that in the one microcomputer wake-up state. In the example shown in FIG. 3, the current consumption in this sub-microcomputer sleep state is 2.3 mA.

Figure 3:
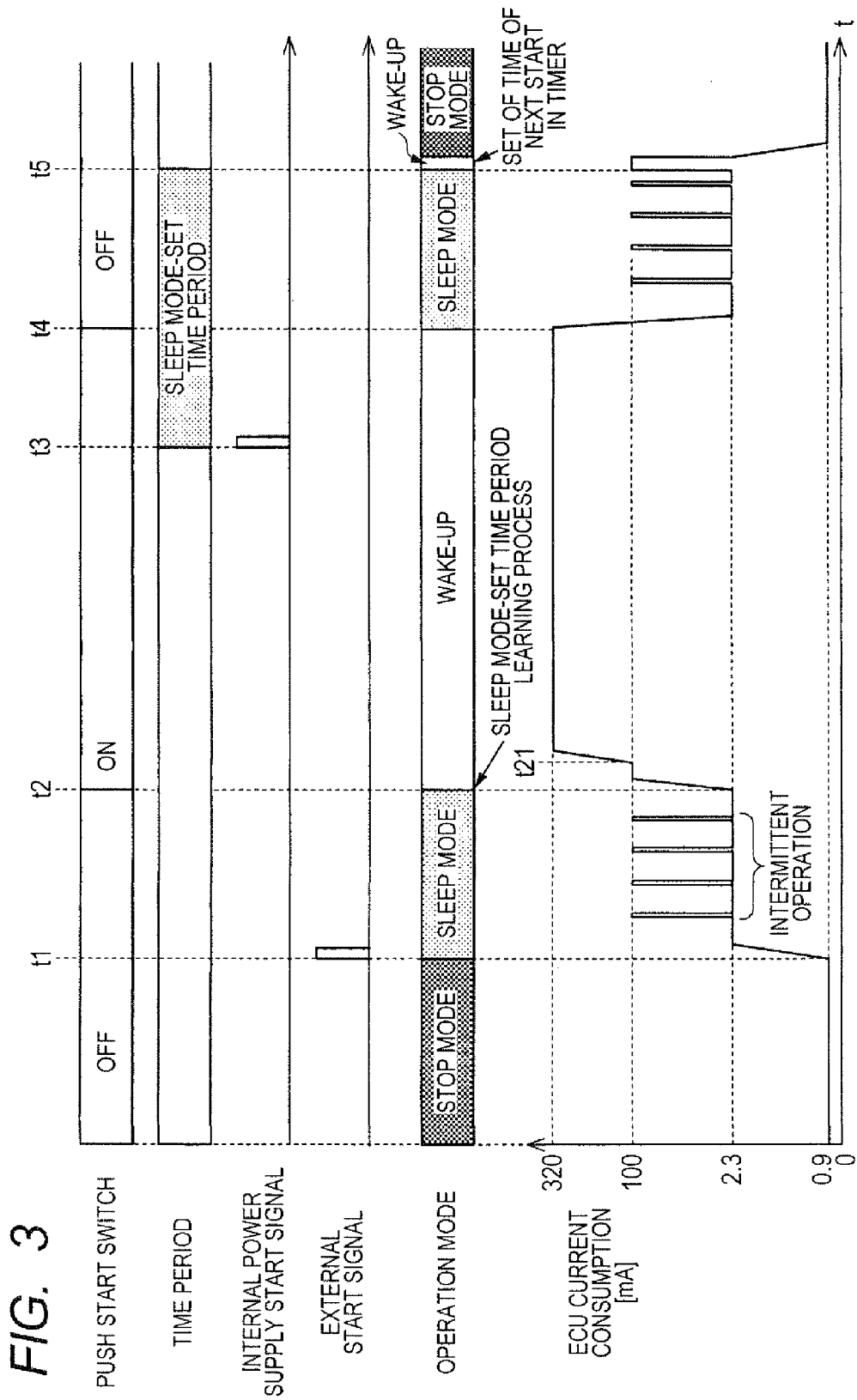
FIG. 3 is a time chart for explaining another example of the operation of the ECU 1.

As seen from FIG. 3, in the sub-microcomputer sleep state, a base time period during which the current consumption (dark current) is 2.3 mA and a short time period (7 ms, for example) during which the current consumption increases to 100 mA alternate each other at a predetermined cycle (at a 5 second cycle, for example). In the sub-microcomputer sleep state where the sub-microcomputer 2 operates intermittently, although the main microcomputer 22 stops operation, the running control IC 24 operates by being supplied with the internal supply voltage Vss through the power supply control transistor 28.

The current consumption in the state where also the sub-microcomputer 21 is in the stop mode and stops operation completely (referred to as "sub-microcomputer stop state" hereinafter) is smaller than that in the sub-microcomputer sleep state. In this sub-microcomputer stop state, the current consumption is at the smallest value of 0.9 mA. Of the components of the ECU 1, only the stabilized power supply circuit 23 and the timer 25 operate in this sub-microcomputer stop state.

Examples of the operation of the ECU 1 having the above described structure are explained with reference to FIGS. 2 and 3. In the example shown in FIG. 2, the sub-microcomputer 21 is in the stop mode before time t1, because the push start switch 12 is off, and the sleep mode-set time period is not reached. Accordingly, the current consumption (dark current) of the whole ECU 1 is at the minimum value of 0.9 mA.

When the sleep mode-set time period is reached at time t1, the internal power supply start signal Sa is outputted from the timer 25 to the stabilized power supply circuit 23. As a result, the stabilized power supply circuit 23 turns on the power supply control transistor 28, so that the internal supply voltage Vss is supplied to the sub-microcomputer 21 and the running control IC 24. As a consequence, the sub-microcomputer 21 operates intermittently in the sleep mode.

When the push start switch 12 is operated at time t2 to enter the ICON state, the sub-microcomputer 21 wakes up, and accordingly the current consumption of the whole ECU 1 increases to 100 mA. Further, since the IG relays 3 and 4 are also turned on in the ICON state, the main relay 2 is turned on so that the main microcomputer 22 is also supplied with power at time t21.

Accordingly, the current consumption of the whole ECU 1 becomes 320 mA. This state is a state where the vehicle is completely activated.

At this time, the sub-microcomputer 21 acquires the current time information from the timer 25 after confirming that the ICON state prevails by receiving the battery voltage +B from the main relay 2. Subsequently, the sub-microcomputer 21 performs the sleep mode-set time period learning process based on the acquired current time information to calculate a sleep mode-set time period.

The current sleep mode-set time period ends at time t3, however, the vehicle is maintained in the activated state (ICON state). Thereafter, when the push start switch 12 is turned off at time t4, the sub-microcomputer 21 turns off the respective relays, and shuts off power supply to the main microcomputer 22. At this time, the sub-microcomputer 21 itself changes to the sleep mode, and performs predetermined processes in the sleep mode until a predetermined time elapses.

After a lapse of the predetermined time, the sleep mode is maintained if any sleep mode-set time period prevails, otherwise, the sub-microcomputer 21 wakes up to output the power supply shut off request signal to the stabilized power supply circuit 23 to shut off power supply to itself. As a result, the sub-microcomputer 21 changes to the stop mode. At this time, before changing to the stop mode, the sub-microcomputer 21 sets a start time of the next sleep mode-set time period in the timer 25. Accordingly, when the start time set in the timer 25 is reached after the sub-microcomputer 21 changes to the stop mode, since the timer 25 outputs the internal power supply start signal Sa, the sub-microcomputer 21 is supplied with power again.

Next, an example shown in FIG. 3 is explained. In this example, the sub-microcomputer 21 is in the stop mode before time t1, because the push start switch 12 is off, and the sleep mode-set time period is not reached. Accordingly, the current consumption current (dark current) of the whole ECU 1 is at the minimum value of 0.9 mA.

When time t1 is reached, although the sleep mode set time period is not reached yet, since the external start signal is received from the OR circuit 17, the timer 25 outputs the internal power supply start signal to the stabilized power supply circuit 23. In response to this, the stabilized power supply circuit 23 turns on the power supply control transistor 28 to supply the internal supply voltage Vss to the sub-microcomputer 21 and the running control IC 24. As a result, the sub-microcomputer 21 starts to perform the foregoing intermittent operation in the sleep mode.

Figure 2:
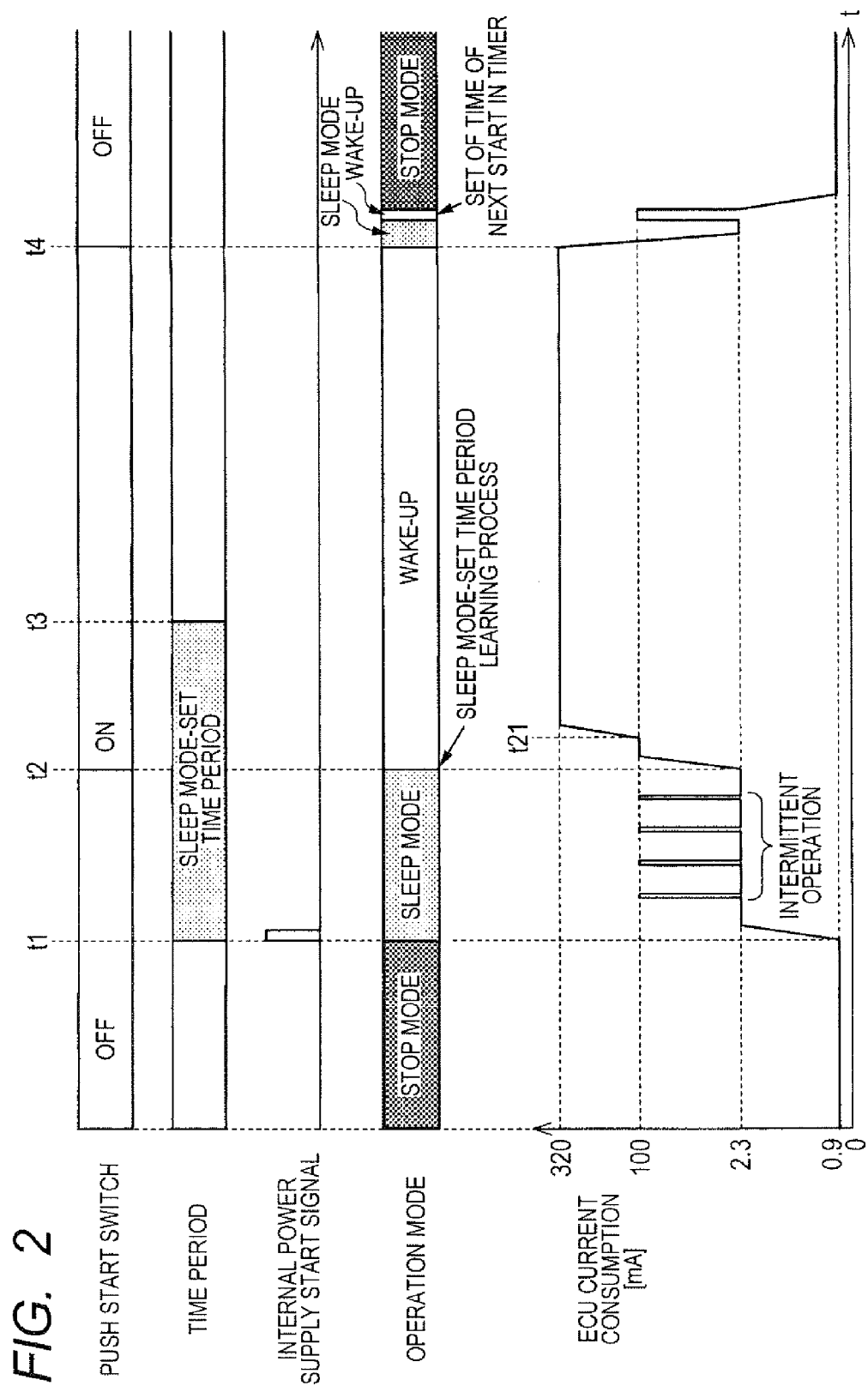
FIG. 2 is a time chart for explaining an example of the operation of the ECU 1.

Thereafter, when the push start switch 12 is operated at time t2, and the IGON state prevails, the sub-microcomputer 21 wakes up, the main microcomputer 22 is supplied with power, and the vehicle is completely activated as in the case of FIG. 2. Also at this time, the sub-microcomputer 21 performs the sleep mode-set time period learning process as in the case of FIG. 2.

Thereafter, when the sleep mode set time period is reached at time t3, the timer 25 outputs the internal power supply start signal to the stabilized power supply circuit 23. In this example, since both the main microcomputer 21 and the sub-microcomputer 22 are supplied with power and operate normally at this time, the internal power supply start signal is made invalid.

When the push start switch 12 is turned off at time t4, the sub-microcomputer 21 turns off the respective relays, and shuts off power supply to the main microcomputer 22. Subsequently, the sub-microcomputer 21 changes to the sleep mode, and performs the predetermined processes in the sleep mode until a predetermined time elapses.

After a lapse of the predetermined time, the sleep mode is maintained if the sleep mode set time period still continues. In this example, since the sleep mode-set time period continues until time t5, the sleep mode is maintained until time t5.

When the sleep mode-set time period ends at time t5, the sub-microcomputer 21 wakes up to perform the predetermined processes including a process to set date and time of a start time of the next sleep mode-set time period in the timer 25, and then changes to the stop mode by outputting the power supply shut off request signal to the stabilized power supply circuit 23 to shut off power supply to itself.

Figure 4:
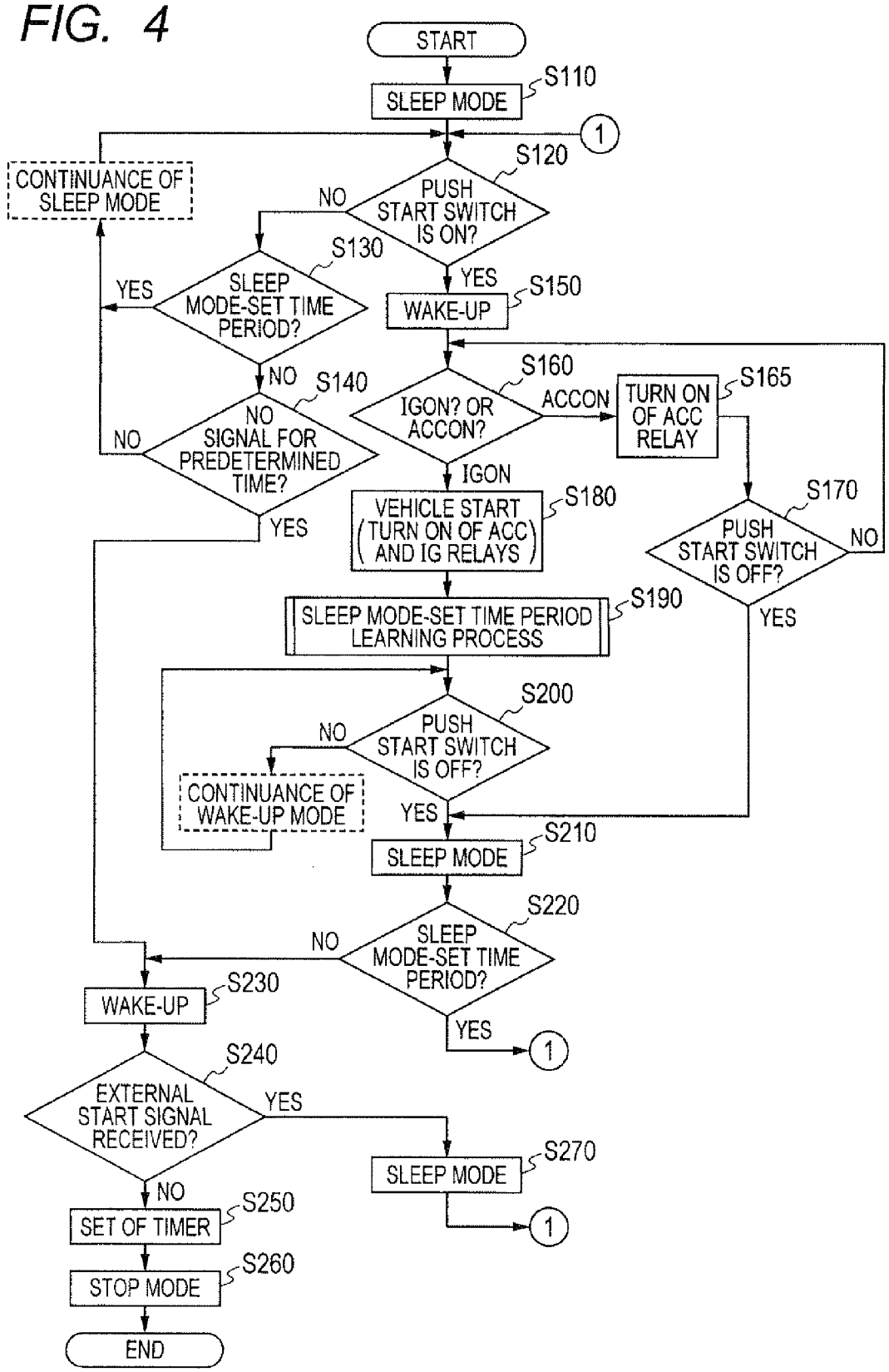
FIG. 4 is a flowchart showing an operation mode switching process performed by a sub-microcomputer included in the ECU 1.

Next, an operation mode switching process performed by the sub-microcomputer 21 is explained with reference to the flowchart of FIG. 4. The sub-microcomputer 21 performs the operation mode switching process when it starts operation by being supplied with the internal supply voltage Vss from the stabilized power supply circuit 23.

At the beginning of this process, the sub-microcomputer 21 changes itself to the sleep mode in step S110.

Subsequently, it is determined in step S120 whether or not the push start switch 12 is turned on, that is, whether the ACCON state or IGON state has prevailed. If the determination result in step S120 is negative, the process proceeds to step S130 to acquire the current time information from the timer 25, and determine whether or not the current time is within the sleep mode-set time period with reference to a sleep mode-set time period table (to be explained later) stored in the sub-storage medium.

If the determination result in step S130 is affirmative, the process returns to step S120 maintaining the sleep mode. If the determination result in step S130 is negative, the process proceeds to step S140 to determine whether or not the no-signal state (the state where there is no signal to be handled by the sub-microcomputer 21) has continued for a certain time. If the determination result in step S140 is affirmative, the process proceeds to step S230.

In step S230, the sub-microcomputer 21 wakes up, and then the process proceeds to step S240 to determine whether or not the external start signal has been received. If the determination result in step S240 is affirmative, the process proceeds to step S270 where the sub-microcomputer 21 changes itself to the sleep mode again, and then the process returns to step S120. If the determination result in step S240 is negative, the process proceeds to step S250 to set a start time of the next sleep mode-set time period in the timer 25 referring to the sleep mode-set time period table, and then proceeds to step S260 where the sub-microcomputer 21 changes to the stop mode. More specifically, in step S260, the sub-microcomputer 21 outputs the power supply shut off request signal to the stabilized power supply circuit 23 to shut off power supply to itself.

If the determination result in step S120 is affirmative, the process proceeds to step S150 where the sub-microcomputer 21 wakes up. In step S160 subsequent to step S150, it is determined whether the content of the operation of the push start switch 12 is to require the ACCON state to prevail (that is, the push start switch 12 has been operated once), or the IGON state to prevail (that is, the push start switch 12 has been operated twice). If it is determined that the IGON state should prevail in step S160, the process proceeds to step S180 to output the power control signal to the stabilized power supply circuit 23 in order to turn on the IG relays 3 and 4 and the ACC relay 5 to thereby activate the vehicle. Subsequently, the process proceeds to step S190 to perform the sleep mode-set time period learning process explained later.

Thereafter, the process proceeds to step S200 to determine whether or not the push start switch 12 has been turned off. If the determination result in step S200 is negative, the wake-up state is continued. If the determination result in step S200 is affirmative, the process proceeds to step S210 where the sub-microcomputer 21 changes to the sleep mode. Subsequently, the process proceeds to step S220 to acquire the current time information to determine whether or not the current time is within the sleep mode-set time period.

If the determination result in step S220 is affirmative, the process returns to step S120 maintaining the sleep state. If the determination result in step S220 is negative, the process performs steps S230 to S260 to change the sub-microcomputer 21 to the stop mode.

If it is determined in step S160 that the ACCON state should prevail, the process proceeds to step S165 to output the power supply control signal to the stabilized power supply circuit 23 in order to turn on the ACC relay 5. Subsequently, it is determined in step S170 whether or not the push start switch 12 is turned off in the ACCON state. If the determination result in step S170 is affirmative, the process proceeds to step S210 to change to the sleep mode again.

That is, in the case where although the push start switch 12 is operated, only the ACC relay 5 has been turned on, the learning (calculation) of the sleep mode-set time period is not performed assuming that the vehicle is not used for its original purpose (not used for running using the motor or engine).

In this embodiment, the learning (calculation) of the sleep mode-set time period is performed based on the current time information only when the push start switch is operated for the IGON state to prevail so that the vehicle can be used for its original purpose.

Next, the sleep mode-set time period learning process performed in step S190 is explained in detail with reference to the flowchart of FIG. 5. The learning process begins at step S310 to read the current date and time, that is, the current time information (a day of week, a time, etc.) at the moment when the push start switch 12 is operated for the IGON state to prevail (referred to as "IGON operation" hereinafter) from the timer 25. Subsequently, the read current time information is stored in the sub-storage medium 26 in step S320.

Thereafter, the learning process proceeds to step S330 to determine whether or not the sleep mode-set time period table stored in the sub-storage medium 26 includes a record of the IGON operation performed during the same time period of the same day of the previous week as a time period including the time at which the current IGON operation has been made (referred to as "current operation time" hereinafter) and having a predetermined length (one hour before and after the current operation time in this embodiment).

FIG. 6 shows a part of the sleep mode-set time period table.

As shown in FIG. 6, the times at which the push start switch 12 was operated are recorded for each day of week in the sleep mode-set time period table. For example, it is recorded in this table that the push start switch 12 was operated (IGON operation) at 6:00, 13:00 and 17:00 on Monday of the previous week.

If the determination result in step S330 is affirmative, that is, if the IGON operation has been performed at a certain time on the current day of the current week, the process proceeds to step S340 to check whether or not there is a record of the IGON operation performed during a time period 2 hours before and after this certain time of a day of the previous week.

If the determination result in step 340 is affirmative, the process proceeds to step S350 to calculate an average time of the times at which the IGON operation was made in the previous week (referred to as "the previous operation time" hereinafter) and the time at which the current IGON operation has been made (referred to as "the current operation time" hereinafter). In subsequent step S360, a time period one hour before and after the calculated average time is recorded in the sleep mode-set time period table stored in the sub-storage medium 26 as one sleep mode-set time period of the same day of the next week.

For example, when the IGON operation has been performed at 20:00 on Tuesday of the current week, it is checked whether there is a record of the IGON operation during a time period from 19:00 to 21:00 on Tuesday of the previous week.

Generally, the time period from 19:00 to 20:00 on Tuesday is a time period in which the frequency of use of the vehicle is relatively high, and accordingly there is a high probability that the IGON operation will be performed in the same time period of the next week.

An average time of the current operation time of 20:00 and the previous operation time 19:00 is calculated as 19:30. The time period one hour before and after the calculated average time, that is, the time period from 18:30 to 20:30 is set as the sleep mode-set time period for Tuesday of the next week as a time period during which the frequency of use of the vehicle is expected to be high. Incidentally, in FIG. 6, the time shown in the upper parenthesis for each day of week in the section of "NEXT WEEK: SLEEP MODE-SET TIME PERIOD" is the calculated average time.

On the other hand, if the determination result in step S340 is negative, the process proceeds to step S370 to calculate the sleep mode-set time period for the next week based on only the current operation time. In this case, a certain time period including the current operation time (the time period one hour before and after the current operation time) is set as one sleep mode-set time period for the same day of the next week in the sleep mode-set time table stored in the sub-storage medium 6.

For example, when the IGON operation has been performed at 16:00 on Friday of the current week, it is checked whether there is a record of the IGON operation during a time period from 15:00 to 17:00 on Friday of the previous week. In this example, although there is a record of the IGON operation at 7:00 and at 19:00, there is no record of the IGON operation during 15:00 to 17:00. Accordingly, the time period one hour before and after the current operation, that is, the time period from 15:00 to 17:00 is set as one sleep mode-set time period for Friday of the next week.

For another example, when the ICON operation has been made at 13:00 on Saturday of the current week, a time period from 12:00 to 14:00 is calculates as the sleep mode-set time period for the next week in the above described way. At this time, the calculated time period from 12:00 to 14:00 is set (stored) as the sleep mode-set time period for Saturday of the next week.

If the IGON operation has been performed again one and half hours later, that is, the IGON operation has been performed at 14:30, a time period from 13:30 to 15:30 is calculates as the sleep mode-set time period for the next week in the above described way. This calculated time period is also set as the sleep mode-set time period for Saturday of the next week. However, the time period from 12:00 to 14:00 has been already set as the sleep mode-set time period for Saturday of the next week.

In such a case, the later calculated time period is overlapped to the earlier calculated time period. That is, a time period from 12:00 to 15:30 obtained by overlapping the currently calculated time period from 13:30 to 15:30 is overlapped to the earlier calculated time period from 12:00 to 14:00 is set (stored) as the updated sleep mode-set time period for Saturday of the next week.

Incidentally, in the case where although there is a record of the IGON operation in the previous week, there is no record of the IGON operation on the current day, this record of the previous week does not affect setting of the sleep mode-set time period of the next week. For example, in this example, although there is a record of the IGON operation at 13:00 on Monday of the previous week, the IGON operation was made at 6:00 and at 19:00 on Monday of the current week, the record of the IGON operation at 13:00 on Monday of the previous week does not affect setting of the sleep mode-set time period for the next week.

As explained above, according to the sleep mode-set time period learning process performed by the ECU 1 of this embodiment, it is possible to shut off power supply to the sub-microcomputer 21 during the sleep mode-set time period in which the frequency of use of the vehicle is low, to thereby reduce the power consumption (the dark current) more than during the sleep mode, and to start power supply to the sub-microcomputer 21 to enable the sub-microcomputer 21 to operate when a time period in which the frequency of use of the vehicle is high is reached by causing the timer 25 to output the internal power supply start signal.

Hence, according to this embodiment, there is provided an ECU which is greatly reduced in its dark current while ensuring convenience for the user of the vehicle.

Second Embodiment

Figure 7:
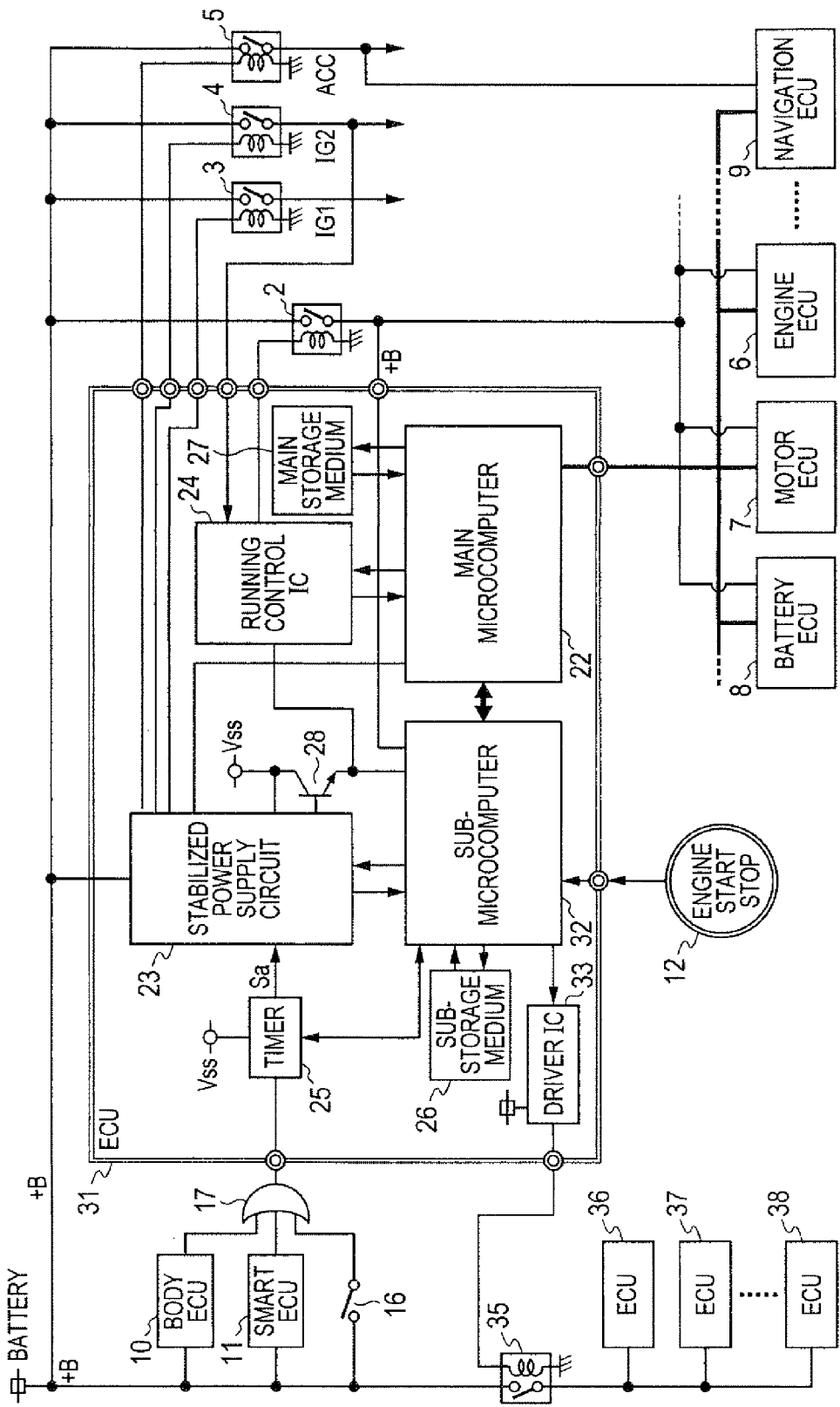
FIG. 7 is a diagram schematically showing the structure of a electronic control system including an ECU31 as a second embodiment of the invention.

Next, a second embodiment of the invention is described with focus on the difference with the first embodiment. FIG. 7 is a diagram schematically showing the structure of a electronic control system including an ECU 31 as a second embodiment of the invention. In FIG. 7, the components that are the same as those shown in the previously described figures are given the same reference numerals, and explanation thereof will be omitted.

The second embodiment differs from the first embodiment mainly in that the second embodiment includes a plurality of ECUs 36, 37, 38, . . . , each of which is always supplied with the battery voltage +B to operate all the time, that a power supply control relay 35 is disposed in a supply path for supplying the battery voltage +B to the ECUs 36, 37, 38, . . . , that the ECU 31 includes a driver IC 33 for driving the power supply control relay 35, and that a sub-microcomputer 32 of the ECU 31 controls the driver IC 33.

In the second embodiment, the sub-microcomputer 32 turns on or off the power supply control relay 35 through the driver IC 33 when the sub-microcomputer 32 changes itself from the sleep mode to the stop mode, or from the stop mode to the sleep mode.

In more detail, the sub-microcomputer 32 controls the driver IC 33 such that the power supply control relay 35 is turned off when it changes from the sleep mode to the stop mode so that supply of the battery voltage +B to the ECUs 36, 37, 38, (referred to as "relay-downstream ECUs" hereinafter) on the downstream from the power supply control relay 35 is shut off.

The sub-microcomputer 32 of the ECU 1 changes to the stop mode when the vehicle is not used, or also when the vehicle is not likely to be used for a while. Accordingly, since stopping the operations of the relay-downstream ECUs at such timings does not raise a practical problem, supply of the battery voltage +B to the relay-downstream ECUs is shut off at such timings in this embodiment.

On the other hand, when the sub-microcomputer 32 of the ECU 1 starts operation by being supplied with power to change from the stop mode to the sleep mode, the sub-microcomputer 32 controls the driver IC 33 to turn on the power supply control relay 35, so that the relay-downstream ECUs are supplied with the battery voltage +B.

According to the electronic control system of this embodiment, since power supply to the relay-downstream ECUs is turned on and off in accordance with the mode change of the sub-microcomputer 32 of the ECU 1 between the sleep mode and the stop mode, and the relay-downstream ECUs stop operations while the sub-microcomputer 32 is in the stop mode, it is possible to further reduce the power consumption (the dark current) of the whole electronic control system.

Incidentally, the control of the power supply control relay 35 does not necessary have to be performed by the sub-microcomputer 32. It may be performed using the signal to turn on and off the power supply control transistor 28, or the internal power supply start signal outputted from the timer 25. The point is that any component or signal may be used to control the power supply control relay 35, if the power supply control relay 35 can be turned on and off in accordance with the mode change between the sleep mode and the stop mode.

Third Embodiment

Figure 8:
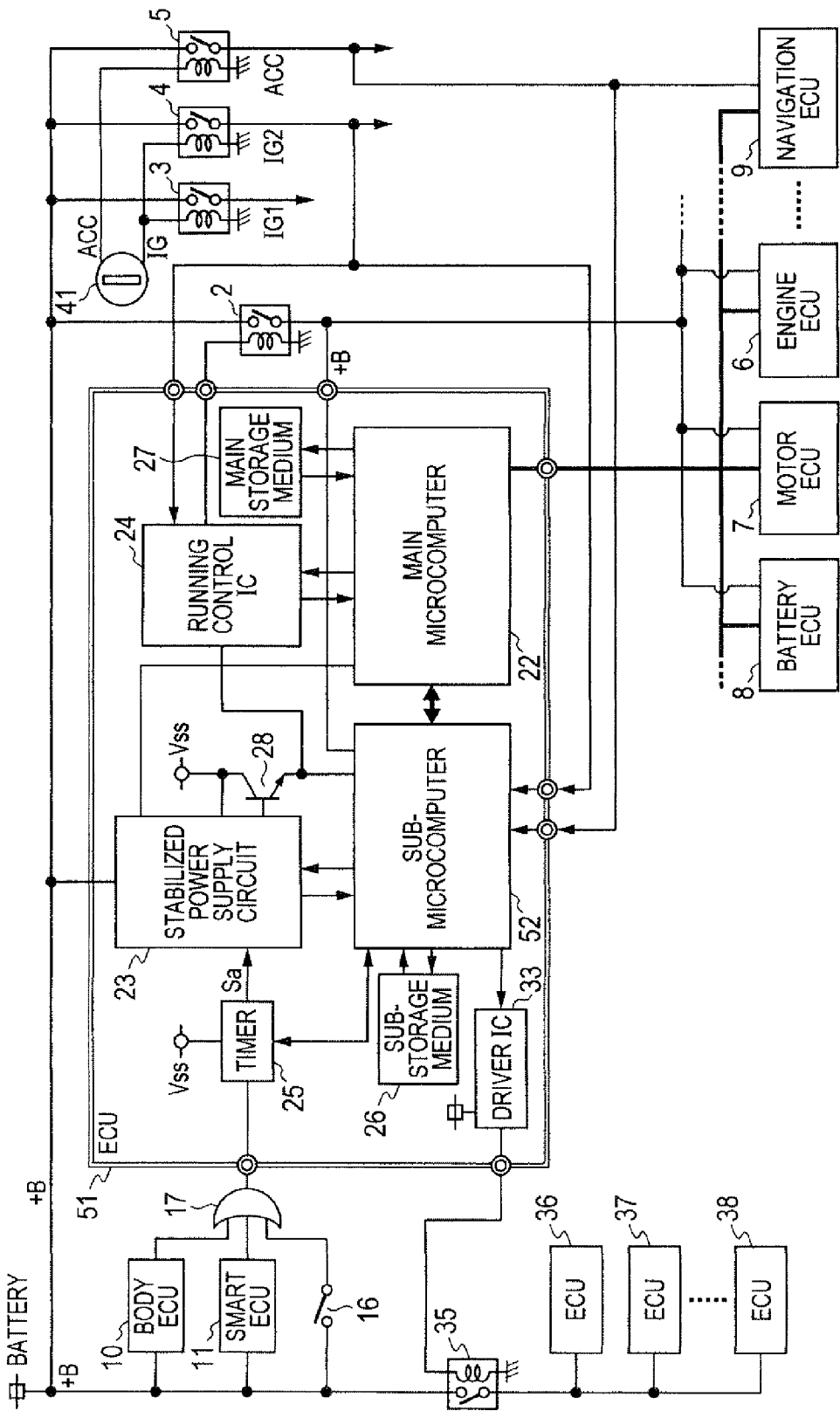
FIG. 8 is a diagram schematically showing the structure of a electronic control system including an ECU51 as a third embodiment of the invention.

Next, a third embodiment of the invention is described with focus on the difference with the second embodiment. FIG. 8 is a diagram schematically showing the structure of a electronic control system including an ECU 51 as a third embodiment of the invention. In FIG. 8, the components that are the same as those shown in the previously described figures are given the same reference numerals, and explanation thereof will be omitted.

The third embodiment differs from the second embodiment in that instead of the push start switch 21, a mechanical key 41 is used as a switch for the user to perform control of the power source, that is, to drive the ACC relay 5 and the IG relays 3 and 4

The mechanical key 41 is a well known key device settable to one of the power ON position, ACCON position, and IGON position by the user's inserting a user key to the key slot of the key device 41 and turning the user key.

When the mechanical key device 41 is set to the ACCON position, the ACC relay 5 is turned on. When the mechanical key device 41 is set to the IGON position, the IG relays 3 and 4 are turned on in addition to the ACC relay 5.

As a result, the battery voltage +B is supplied to the sub-microcomputer 52 of the ECU 51 through the ACC relay 5 and the second IG relay 4. The sub-microcomputer 52 determines that the IGON operation is performed when supplied with the battery voltage +B through the second 1G relay 4, and performs the various processes as in the case where the IGON operation is performed in the foregoing embodiments.

Figure 5:
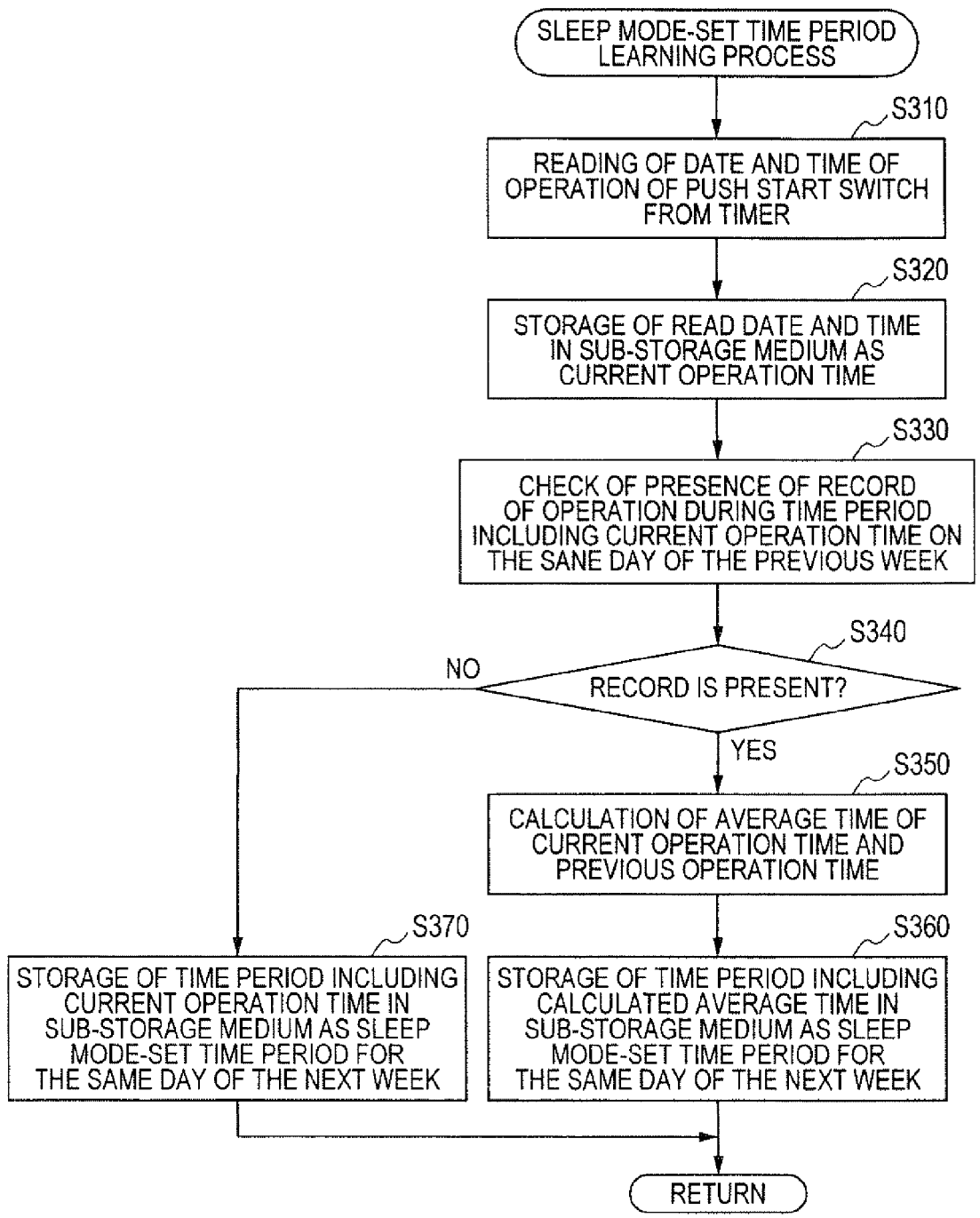
FIG. 5 is a flowchart showing a sleep mode-set time period learning process performed in step S190 of the operation mode switching process shown in FIG. 4.

Accordingly, the ECU 51 of this embodiment acquires the current time information from the timer 25 when supplied with the battery voltage +B from the second IG relay 4 in order to perform the sleep mode-set time period learning process shown in FIG. 5.

Accordingly, also according to this embodiment, there is provided an ECU which is greatly reduced in its dark current while ensuring convenience for the user of the vehicle.

Modifications

It is a matter of course that various modifications can be made to the above embodiments as described below.

The above embodiments are configured to perform the sleep mode-set time period learning process shown in FIG. 5. However, the above embodiments may be configured to perform any different learning process, if it enables learning the frequency distribution of use of the vehicle and setting a time period in which the frequency of use of the vehicle is high as the sleep mode-set time period, and changing to the stop mode when the frequency of use of the vehicle is low.

For example, although the learning process is performed based on the time at which the IGON operation was performed in the previous week and the time at which the IGON operation has been performed on the current day in the above embodiments, it may be performed based on including the time at which the IGON operation was performed in the week before the previous week. Further, the calculation of the sleep mode-set time period may be performed for a plurality of weeks at the same time instead of for only the next week.

In the first embodiment, the sub-microcomputer 21 outputs the main microcomputer power supply signal to the stabilized power supply circuit 23 upon detecting the battery voltage +B from the main relay 2, to cause the stabilized power supply circuit 23 to supply power to the main microcomputer 22. However, the sub-microcomputer 21 may be configured to output the main microcomputer power supply signal to the stabilized power supply circuit 23 upon reception of the signal which the running control IC outputs to drive the main relay 2. Other than the above, the method (timing) to control power supply to the main microcomputer 22 by the sub-microcomputer 21 may be contrived in various ways. The point is that power supply to the main microcomputer 22 is started when it is confirmed that the main relay 2 is turned on and the battery voltage +B is supplied to the running system ECUs including the engine ECU 6. Alternatively, power supply to the main microcomputer 22 may be started upon detecting that the push start switch 12 is operated for the ICON state to prevail.

Further, instead of the running control IC 24, the stabilized power supply circuit 23 may output the signal to drive the main relay 2.

In the above embodiments, the OR circuit 17 is inputted with the body system operation signal from the body ECU 10, the smart system operation signal from the smart ECU 11 and the door open signal from the door open/close detection switch 16. However, these operation signals are only examples. All the signals each indicating that the driver or user of the vehicle has performed an operation requiring the sub-microcomputer 21 to operate may be inputted to the OR circuit 17, and further to the timer 25 as external start signals.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use electronic control device including at least one function circuit and a power supply to generate an operating voltage of the function circuit from a battery voltage of a battery mounted on a vehicle, and supply the operating voltage to the function circuit, comprising:
   a first microcomputer configured to be in a normal operation mode to operate normally while a predetermined start condition is satisfied, and to be in a sleep mode where a consumption current thereof is smaller than in the normal operation mode while a predetermined standby condition is satisfied;
   a clock unit configured to clock a current time to provide current time information indicating at least the current time;
   a use detection unit configured to detect use of the vehicle in a predetermined use state;
   a prediction unit configured to acquire the current time information from the clock unit when the use detection unit detects use of the vehicle, and performs a predictive calculation to calculate a frequent use time period in which frequency of use of the vehicle is high based on the acquired time information; and
   a storage memory configured to store the calculated frequent use time period;
   wherein the first microcomputer outputs a power shut off command to the power supply instructing to shut off supply of the operating voltage to the first microcomputer when the first microcomputer is in the sleep mode and the frequent use time period does not prevail, and informs the clock unit of a start time of a next frequent use time period referring to stored contents of the storage memory,
   the clock unit outputs a start signal to the power supply when the start time informed from the first microcomputer is reached,
   the power supply shuts off supply of the operating voltage to the first microcomputer upon reception of the power shut off command from the first microcomputer, and starts supply of the operating voltage to the first microcomputer upon reception of the start signal from the clock unit, and
   the clock unit is disposed outside and separately from the first microcomputer.

2. The vehicle-use electronic control device according to claim 1, wherein the prediction unit stores the time information received from the clock unit in the storage memory each time the use detection unit detects use of the vehicle, and performs the predictive calculation using the current time information received from the clock unit when the use detection unit detects use of the vehicle, and the past time information stored in the storage memory.

3. The vehicle-use electronic control device according to claim 2, further comprising a second microcomputer configured to control a running power source of the vehicle,
   the first microcomputer being configured to change to the normal operation mode when an ON operation is performed to a power source switch of the vehicle in order to activate the running power source, while outputting an ON operation signal indicative of the ON operation having been performed,
   the power supply being configured to supply the operating voltage to the second microcomputer upon reception of the On operation signal from the first microcomputer.

4. The vehicle-use electronic control device according to claim 3, wherein the use detection unit detects the ON operation as use of the vehicle.

5. The vehicle-use electronic control device according to claim 1, wherein
   an electrical load device mounted on the vehicle is connected to the battery through a power supply path to operate on the battery voltage,
   the supply path is provided with an external relay turned on and off to make and break connection between the battery and the electrical load device, and
   the vehicle-use electronic control device further comprises an external relay driver configured to turn off the external relay when supply of the operating voltage from the power supply to the first microcomputer is shut off, and turns on the external relay when supply of the operating voltage from the power supply to the first microcomputer is started by the start signal outputted from the clock unit.

6. The vehicle-use electronic control device according to claim 1, wherein the vehicle is configured to enable an external start signal being inputted to the vehicle-use electronic control device to start the first microcomputer when a predetermined condition is satisfied, and the clock unit is configured to receive the external start signal and output the start signal to the power supply upon reception of the external start signal.

7. The vehicle-use electronic control device according to claim 1, wherein the use detection unit and the prediction unit are implemented by the first microcomputer.

8. The vehicle-use electronic control device according to claim 1, wherein the clock unit is constituted of a real-time clock device.

9. The vehicle-use electronic control device according to claim 1, wherein starting the supply of the operating voltage to the first microcomputer upon reception of the start signal from the clock unit enables the first microcomputer to change to the sleep mode from the stop mode.

10. A vehicle-use electronic control device including at least one function circuit and a power supply to generate an operating voltage of the function circuit from a battery voltage of a battery mounted on a vehicle, and supply the operating voltage to the function circuit, comprising:
    a timer configured to determine a current time to provide current time information indicating at least the current time; and
    a first microcomputer, disposed externally from the timer, the first microcomputer configured to:
      operate in a normal operation mode to operate normally while a predetermined start condition is satisfied;
      operate in a sleep mode where a consumption current thereof is smaller than in the normal operation mode while a predetermined standby condition is satisfied;
      detect use of the vehicle in a predetermined use state;
      acquire the current time information from the timer when the use of the vehicle is detected;
      perform a predictive calculation to calculate a frequent use time period in which frequency of use of the vehicle is high based on the acquired time information; and output a power shut off command to the power supply instructing to shut off supply of the operating voltage to the first microcomputer when the first microcomputer is in the sleep mode and the frequent use time period does not prevail, and inform the timer of a start time of a next frequent use time period; wherein the timer is configured to output a start signal to the power supply when the start time informed from the first microcomputer is reached; and the power supply is configured to shut off supply of the operating voltage to the first microcomputer upon reception of the power shut off command from the first microcomputer, and start supply of the operating voltage to the first microcomputer upon reception of the start signal from the timer.

11. The vehicle-use electronic control device according to claim 10, wherein the first microcomputer is configured to store the time information received from the timer each time use of the vehicle is detected, and perform the predictive calculation using the current time information received from the timer when use of the vehicle is detected, and the past time information stored.

12. The vehicle-use electronic control device according to claim 11, further comprising a second microcomputer configured to control a running power source of the vehicle, the first microcomputer being configured to change to the normal operation mode when an ON operation is performed to a power source switch of the vehicle in order to activate the running power source, while outputting an ON operation signal indicative of the ON operation having been performed, the power supply being configured to supply the operating voltage to the second microcomputer upon reception of the On operation signal from the first microcomputer.

13. The vehicle-use electronic control device according to claim 12, wherein the first microcomputer is configured to detect the ON operation as use of the vehicle.

14. The vehicle-use electronic control device according to claim 10, wherein an electrical load device mounted on the vehicle is connected to the battery through a power supply path to operate on the battery voltage, the supply path is provided with an external relay turned on and off to make and break connection between the battery and the electrical load device, and the vehicle-use electronic control device further comprises an external relay driver configured to turn off the external relay when supply of the operating voltage from the power supply to the first microcomputer is shut off, and turns on the external relay when supply of the operating voltage from the power supply to the first microcomputer is started by the start signal outputted from the timer.

15. The vehicle-use electronic control device according to claim 10, wherein the vehicle is configured to enable an external start signal being inputted to the vehicle-use electronic control device to start the first microcomputer when a predetermined condition is satisfied, and the timer is configured to receive the external start signal and output the start signal to the power supply upon reception of the external start signal.

16. The vehicle-use electronic control device according to claim 10, wherein starting the supply of the operating voltage to the first microcomputer upon reception of the start signal from the timer enables the first microcomputer to enter the sleep mode from the stop mode.

* * * * *